United States Patent
Duan

(10) Patent No.: US 10,569,635 B2
(45) Date of Patent: Feb. 25, 2020

(54) HYBRID ELECTRIC DRIVE TRAIN OF A MOTOR VEHICLE

(71) Applicant: Zhihui Duan, Ann Arbor, MI (US)

(72) Inventor: Zhihui Duan, Ann Arbor, MI (US)

( * ) Notice: Subject to any disclaimer, the term of this patent is extended or adjusted under 35 U.S.C. 154(b) by 66 days.

(21) Appl. No.: 15/932,019

(22) Filed: Jan. 25, 2018

(65) Prior Publication Data
US 2019/0225069 A1    Jul. 25, 2019

(51) Int. Cl.
| | |
|---|---|
| *F16H 3/00* | (2006.01) |
| *B60K 6/365* | (2007.10) |
| *F16H 37/06* | (2006.01) |
| *F16H 3/087* | (2006.01) |
| *B60K 6/48* | (2007.10) |
| *B60K 6/547* | (2007.10) |
| *F16H 3/58* | (2006.01) |
| *F16H 3/54* | (2006.01) |
| *F16H 3/72* | (2006.01) |

(52) U.S. Cl.
CPC .............. *B60K 6/365* (2013.01); *B60K 6/48* (2013.01); *B60K 6/547* (2013.01); *F16H 3/006* (2013.01); *F16H 3/087* (2013.01); *F16H 3/54* (2013.01); *F16H 3/58* (2013.01); *F16H 3/725* (2013.01); *F16H 37/065* (2013.01); *B60K 2006/4816* (2013.01); *B60Y 2200/92* (2013.01); *F16H 2200/2005* (2013.01); *F16H 2200/2035* (2013.01); *Y10S 903/91* (2013.01); *Y10S 903/919* (2013.01)

(58) Field of Classification Search
CPC .......... F16H 3/126; F16H 3/727; F16H 3/725; F16H 3/728; F16H 2003/123; F16H 3/54; F16H 3/58; F16H 3/087; F16H 37/065; F16H 3/006; F16H 2200/2005; B60K 6/365; B60K 6/547; B60K 6/48; B60K 2006/4816; Y10S 903/919; Y10S 903/91; B60Y 2200/92
USPC .......................................................... 475/4, 5
See application file for complete search history.

(56) References Cited

U.S. PATENT DOCUMENTS

| | | |
|---|---|---|
| 7,575,529 B2 | 8/2009 | Holmes |
| 8,075,436 B2 * | 12/2011 | Bachmann ............. B60K 6/365 475/209 |
| 8,506,450 B2 | 8/2013 | Nakasako |
| 8,585,522 B2 | 11/2013 | Kaltenbach et al. |

(Continued)

*Primary Examiner* — Jeffrey A Shapiro

(57) ABSTRACT

A hybrid electric drive train for a motor vehicle comprises an engine with a drive shaft, an electric motor operable of motoring and generating, a differential transmission, and a multi-stage transmission with two input shafts and at least one output shaft. The differential transmission includes a planetary gear set, a clutch and a brake. The planetary gearset has a first element connected to the motor and the second input shaft of the transmission, a second element connected to the engine shaft, and a third element connected to the first input shaft of the transmission. The clutch is located between any two elements of the planetary gear set, and the brake is connected to the engine shaft. The transmission has a plurality of gearsets, and the driving gears of odd-numbered gearsets are mounted on the first input shaft while the driving gears of even-numbered gearsets are mounted on the second input shaft. The engine shaft can achieve every gear ratio of the gearsets. In addition, the engine shaft can also achieve a plurality of derivative speed ratios.

7 Claims, 8 Drawing Sheets

(56) References Cited

U.S. PATENT DOCUMENTS

| | | | |
|---|---|---|---|
| 8,784,245 B2 | 7/2014 | Ideshio et al. | |
| 9,022,891 B2 | 5/2015 | Phillips | |
| 9,168,918 B2 | 10/2015 | Lee et al. | |
| 9,409,473 B2* | 8/2016 | Kaltenbach | B60K 6/387 |
| 2010/0009805 A1* | 1/2010 | Bachmann | B60K 6/365 |
| | | | 477/5 |
| 2010/0113217 A1* | 5/2010 | Terwart | F16H 61/0403 |
| | | | 477/79 |
| 2013/0096761 A1* | 4/2013 | Kuroda | B60K 6/48 |
| | | | 701/22 |
| 2013/0109530 A1* | 5/2013 | Kaltenbach | B60K 6/387 |
| | | | 477/5 |
| 2014/0000412 A1* | 1/2014 | Kaltenbach | B60K 6/387 |
| | | | 74/661 |
| 2016/0263984 A1* | 9/2016 | Kasuya | B60K 6/26 |

\* cited by examiner

HYBRID ELECTRIC DRIVE TRAIN OF A MOTOR VEHICLE

FEDERALLY SPONSORED RESEARCH

Not Applicable

SEQUENCE LIST OR PROGRAM

Not Applicable

TECHNICAL FIELD

The present disclosure relates to a hybrid electric drive train, and, more particularly, to a hybrid electric drive train having a single electric motor and a transmission with two input shafts.

BACKGROUND OF THE INVENTION

Hybrid electric vehicles (HEV) can save a significant amount fuel, compared with conventional vehicles. A HEV has at least two power sources: one heat engine and at least one electric motor, and can be driven either by electric motor(s) or by the engine together with the electric motor(s).

A widely used hybrid electric drive is called parallel hybrid electric drive train with a single motor. This kind of hybrid electric drive train comprises a heat engine, an electric motor, a power coupling mechanism and a mechanical transmission. Usually, the motor is between the engine and the transmission, and the power coupling mechanism is between the engine and the motor.

The engine is to provide power to the vehicle, and it may be turned off when coming to a stop or during electric driving. The motor has many functions, including driving vehicle by itself, assisting engine to drive, starting the engine, generating electricity, and applying regenerative braking, etc. The power coupling mechanism has functions of engaging/disengaging engine shaft to the transmission. The function of mechanical transmission is to change the speed ratio between the input shaft and the output shaft, so that the engine and motor can work efficiently.

Dual clutch transmissions (DCT) are wildly used in hybrid electric vehicles as the transmission. A DCT transmits power through highly efficient intermeshing gear sets and usually exhibit excellent fuel economy. The synchronizers used in DCT have low spin losses and also contribute to overall operating efficiency. The overall powertrain efficiency also benefits from the flexibility for ratio selection in design.

U.S. Pat. No. 9,308,907 publish a hybrid electric drive system, using DCT as the transmission. The DCT has two clutches: one is connected to the first input shaft and the other is connected to the second input shaft. The electric motor is located between the engine shaft and the two clutches; there is a disconnecting clutch between the motor and the engine shaft. In electric driving mode, the disconnecting clutch is disengaged, and the engine is off and disconnected from the powertrain; the motor works and outputs torque through the gearbox to drive the wheels. When the engine is working, the disconnecting clutch is engaged, connecting the engine to the transmission, and the engine outputs power through the gearbox to drive the wheels. This hybrid transmission is efficient and powerful.

However, DCTs have a few unique design considerations. For example, during a vehicle launches, the dual clutch has to deal with relatively large amount of heat generated by friction. In order to avoid overheated, a dual clutch assembly usually is of large size and takes a large volume of space. Another consideration is how to get more gear ratios for a DCT. Transmissions tend to have more and more speeds or gear ratios if practicable and affordable. Some automatic transmissions with 9 or 10 speeds have come into market. For a DCT, one gear set is usually needed for one more speed, so the number of gear sets has to be increased if more speeds are desired. Having more than 8 speeds will result in a large length of transmissions, and it may cause some issue of packaging the transmission into the engine cabin.

SUMMARY OF THE INVENTION

The present disclosure provides a hybrid electric drive train comprising a heat engine with a drive shaft, an electric motor operable of motoring and generating, a differential transmission, and a multi-stage transmission with two input shafts and at least one output shaft. The transmission includes a plurality of intermeshing gearsets, including a reversing gearset. The driving gears of the odd-numbered gearsets are mounted on the first input shaft, and the driving gears of even-numbered gear sets are mounted on the second input shaft. The driven gears are mounted on the output shaft(s). The differential transmission comprises a planetary gear set, a clutch, and a brake. The planetary gear set has at least three elements. The first element is connected to the motor and also connected to the second input shaft of the transmission. The second element is connected to the engine shaft. The third element is connected to the first input shaft of the transmission. The clutch is located between any two elements of the planetary gear set. When the clutch is engaged, the three elements are locked together and run at same speed. When the clutch is disengaged, the three elements can run at different speeds but must satisfy a certain kinetic constraint. The brake is mounted on the engine shaft, and when being applied, it will keep the engine shaft from rotating.

The hybrid electric drive train by the present invention can achieve a plurality of original gear ratios, and each of the original gear ratios is solely defined by one of the intermeshing gearsets in the transmission. If the clutch is engaged, the planetary gear set will be locked together, and, according to the connection, the engine shaft, the first input shaft and the second input shaft are locked together, too. If one of the odd-numbered gearsets is selected, the first input shaft will have the gear ratio of the odd-numbered gearset selected; if one of the even-numbered gearsets is selected, the second input shaft will have the gear ratio of the even-numbered gearset selected. So, if the clutch is engaged and a certain gearset is selected, the engine shaft will have the gear ratio of the selected gearset, either an odd-numbered or an even-numbered gearset. The engine shaft can achieve every of the gears by selecting each of the gearsets in turn.

In another aspect of the present invention, the hybrid electric drive train by the present invention can also achieve a plurality of derivative gear ratios. A derivative gear ratio is derived from a combination of one odd-numbered gearset and one even-numbered gearset. When the clutch is disengaged, the three elements of the differential can run at different speeds, but the speeds must satisfy a certain kinetic constraint. In this case, if one odd-numbered gearset and one even-numbered gearset are selected at the same time, the three elements of the differential will run at different speeds. The first input shaft will have the gear ratio of the odd-numbered gearset selected, and the second input shaft will the gear ratio of the even-numbered gearset selected.

According to the kinetic constraint of the planetary gear set, the engine shaft connected to the second element of the differential will have a speed ratio different from those of the odd-numbered gearset selected and the even-numbered gearset selected. Therefore, the engine shaft can have a speed ratio that is different from any gear ratio of the intermeshing gearsets, and this speed ratio is called a derivative speed ratio, or a derivative gear ratio. A plurality of combinations of an odd-numbered gearset and an even-numbered gearset make reasonable derivative speed ratios.

Thus, the hybrid electric drive train by the present invention can achieve a plurality of original gear ratios and a plurality of derivative gear ratios. The total number of gear ratios is about double of the number of intermeshing gearsets in the transmission.

In another aspect of the invention, by working together, the motor and the planetary gear set can facilitate the engine to drive the vehicle launching. Before the vehicle launches, the engine is running idle, the brake and the clutch are disengaged, the first gearset is selected, and the motor is running backwards. When the vehicle begins to launch, the engine outputs torque and runs at a certain speed, and the motor applies forward torque while running backwards. The torques from the engine and the motor, through the transmission, drives the wheels and accelerates the vehicle. The motor also accelerates in the forward direction, and the motor speed becomes positive gradually from negative before launching. When the motor speed is about equal to the engine speed, the clutch is engaged. Now system achieves the first gear on the transmission, and the engine and the motor drive in parallel.

Thus, the present invention eliminates the slipping friction in the dual clutch and solves the issue that the dual clutch is possibly over heated. Therefore, there is no need for large size clutch.

In another aspect of the present invention, the hybrid electric drive by the present invention can be shifted from an odd gear to an even gear, and vice versa, without a dual clutch assembly. To shift a gear, the speed of the engine or the motor is adjusted to synchronize the corresponding input shaft with the gearset to-be-selected, then the synchronizer is engaged effortlessly. Also, the torques of the engine and the motor are adjusted to remove the torque on the synchronizer currently engaged, and then the synchronizer is disengaged easily. When the engine is doing synchronization, the motor is driving the vehicle, and when the motor is doing synchronization, the engine is driving the vehicle. Therefore, there is no power pithole, and the shifting can be very smooth.

Thus, the present invention eliminates the need for the dual clutch which is of large size and expensive. Taking the place of the dual clutch, the clutch and the planetary gear set can be installed inside the motor rotor, shorting the overall length of the transmission.

DETAILED DESCRIPTION OF THE PREFERRED EMBODIMENTS

First Embodiment

Figure 1:
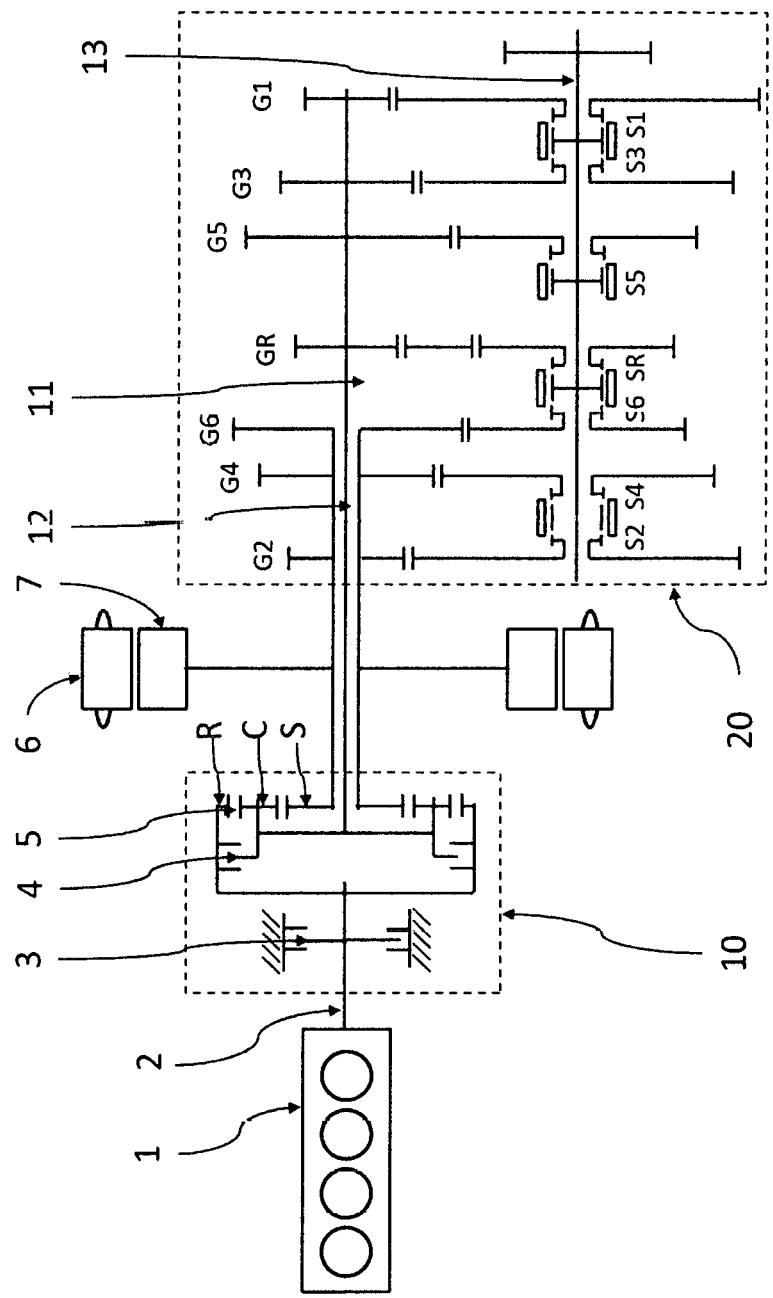
FIG. 1 is the schematic presentation of a first embodiment of a hybrid electric drive train of the invention.

FIG. 1 shows the schematic view of a hybrid electric drive train of a motor vehicle according to a first embodiment of the present invention. The hybrid electric drive train comprises an engine 1 with a drive shaft 2, an electric motor 6 with rotor 7 operable of motoring and generating, a differential transmission 10, and a multi-stage transmission 20 with two input shafts.

Differential transmission 10 comprises a planetary gear set 5, a brake 3, and a clutch 4. Planetary gear set 5 (PGS 5) is with single planet gears and has, at least, three elements: a sun gear S, a ring gear R, and a carrier C. Sun gear S is connected to motor rotor 7, and ring gear R is connected engine shaft 2. Brake 3 is connected to ring gear R. If it is engaged, brake 3 will keep ring gear R and engine shaft 2 from rotating. Clutch 4 is installed between any two elements of planetary gear set 5. If it is engaged, clutch 4 will lock up planetary gear set 5, and the three elements of PGS 5 will run at a same speed.

Transmission 20 comprises of a first input shaft 11, a second input shaft 12, at least one output shaft 13, a plurality of forward gearsets G1, G2, G3 and etc. and at least a reverse gearset GR. First input shaft 11 is connected to carrier C, and second input shaft 12 is connected to sun gear S. Each of gearsets G1~G6 and GR has its own synchronizer S1~S6 and SR, and a gearset is selected if its synchronizer is engaged. The driving gears of the odd-numbered gearsets are mounted on first input shaft 11, and the driving gears of the even-numbered gearsets are mounted on second input shaft 12. The driven gears of the gearsets are mounted on output shaft 13. Here transmission 20 with 6 pairs of forward gears is just for an example, and more gearsets can be added if it is desired. All the skilled in the art understood that some transmissions have two output shafts in order to reduce the length of transmission 20, and it would not make any different from the view point of speed ratios.

Speeds of Sun Gear, Ring Gear and Carrier of a Planetary Gear Set

Figure 2:
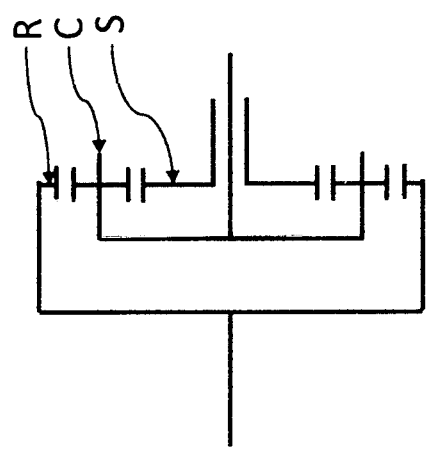
FIG. 2 is the schematic presentation of a planetary gear set with single planet gears.
Figure 2:
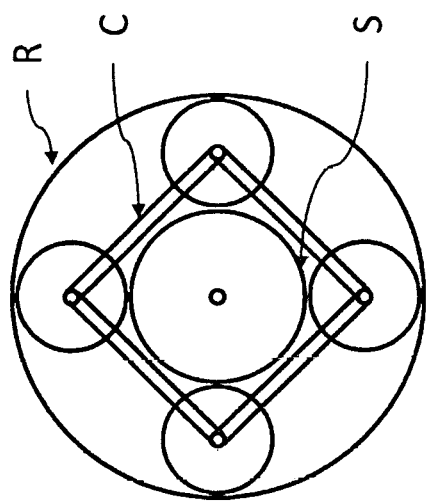

For a planetary gear set (PGS) with single planet gears as shown in FIG. 2, the speeds of sun gear S, ring gear R, and carrier C must satisfy the kinematic constraint as shown in Eq. (1):

$$ZS \cdot n_S + ZR \cdot n_R = (ZR + ZS) \cdot n_C \qquad (1)$$

where $n_S$, $n_R$ and $n_C$ are the speeds of sun gear S, ring gear R and carrier C, respectively, and ZS and ZR are the tooth numbers of sun gear S and ring gear R, respectively.

Figure 3:
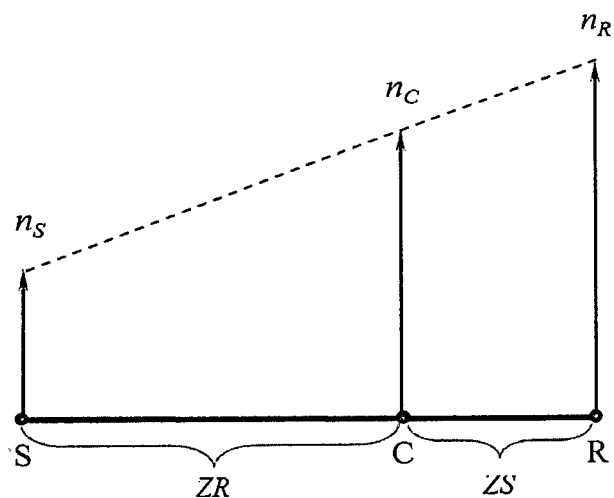
FIG. 3 is the lever diagram presentation of the kinetic constraint among the speeds of the sun gear, the ring gear and the carrier of a planetary gear set with single planet gears.

This kinematic constraint can be visualized by the lever diagram as shown in FIG. 3. The three nodes on the lever diagram represent sun gear S, ring gear R and carrier C of the planetary gear set 5, and the lever lengths represent the tooth numbers of sun gear S and ring gear R. Starting from each node and perpendicular to the levers, three vectors represent the direction and magnitude of the speeds of the corresponding elements. The kinematic constraint as shown in Eq. (1) is equivalent to that the ending points of the three vectors are all on a straight (dash) line.

If any two of the three elements are locked together, these two elements will have the same speed. According to the kinematic constraint, the third element will also have the same speed, $n_R = n_S = n_C$. In the lever diagram, the three vectors have the same direction and magnitude, and the straight dash line is horizontal.

If both sides of EQ. (1) are divided by the speed of output shaft 13 of transmission 20, then EQ. (1) becomes:

$$ZR \cdot \eta_R + ZS \cdot \eta_S = (ZR + ZS) \cdot \eta_C \qquad (2)$$

where $\eta_S$, $\eta_R$, and $\eta_C$ represent the speed ratios of sun gear S, ring gear R and carrier C to output shaft 13 of transmission 20, respectively.

Figure 4:
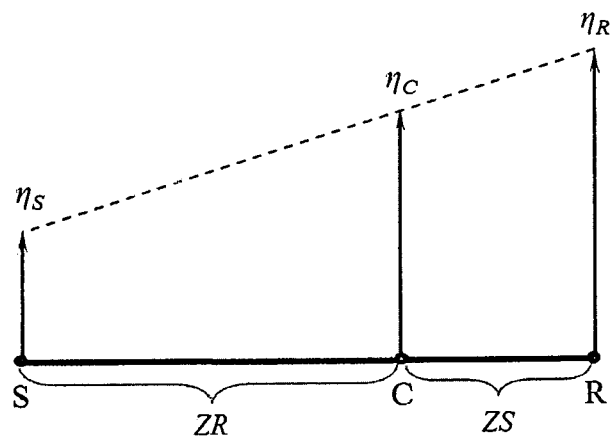
FIG. 4 is the lever diagram presentation of the kinetic constraint among the speed ratios of the sun gear, the ring gear and the carrier of a planetary gear set with single planet gears.

Now in the lever diagram as shown in FIG. 4, the three vectors represent the speed ratios of sun gear S, ring gear R and carrier C to output shaft 13, respectively.

If clutch 4 between any two of the three elements is engaged, the two elements will have the same speed. As a result, the third element will have the same speed. That is, if clutch 4 is engaged, sun gear S, ring gear R and carrier C will rotate at the same speed.

$$n_R = n_S = n_C$$

and $$\eta_R = \eta_S = \eta_C$$

which can be visualized by a horizontal straight line in the lever diagram as shown in FIGS. 3 and 4.

Original Speed Ratios

In transmission 20, each of the gearsets G1~G6 has a fixed gear ratio or a fixed speed ratio. Gearset 1 has a fixed gear ratio of $\eta 1$, gearset 2 has a fixed gear ratio of $\eta 2$, and etc. If the synchronizer of a certain gearset is engaged, the gearset is said selected. For example, gearset G3 is selected if synchronizer S3 is engaged.

If gearset G3 is selected as an example of the odd-numbered gears, first input shaft 11 will have a speed ratio of $\eta 3$. Connected to first input shaft 11, carrier C will also have the speed ratio of $\eta_3$. If, at the same time, clutch 4 is engaged, ring gear R and sun gear S will have the speed ratio of $\eta 3$, too. Especially, connected to ring gear R, engine shaft 2 has the same speed ratio of $\eta 3$. Similarly, engine shaft 2 can achieve all other odd-numbered gears by engaging clutch 4 and selecting one of the odd-numbered gearsets in turn.

If gearset G4 is selected as an example of the even-numbered gears, second input shaft 12 will have a speed ratio of $\eta 4$. Connected to second input shaft 12, sun gear S will have the same speed ratio of $\eta 4$. If, at the same time, clutch 4 is engaged, ring gear R and carrier C will also have the speed ratio of $\eta 4$, too. Especially, since connected to ring gear R, engine shaft 2 has the speed ratio of $\eta 4$. Similarly, engine shaft 2 can achieve all other even-numbered gears by engaging clutch 4 and selecting one of the even-numbered gearsets in turn.

In this way, by selecting each of the gearsets in turn and engaging clutch 4, engine shaft 2 can achieve each of speed ratios of $\eta 1$, $\eta 2$, $\eta 3$, $\eta 4$, $\eta 5$, $\eta 6$.

Figure 5:
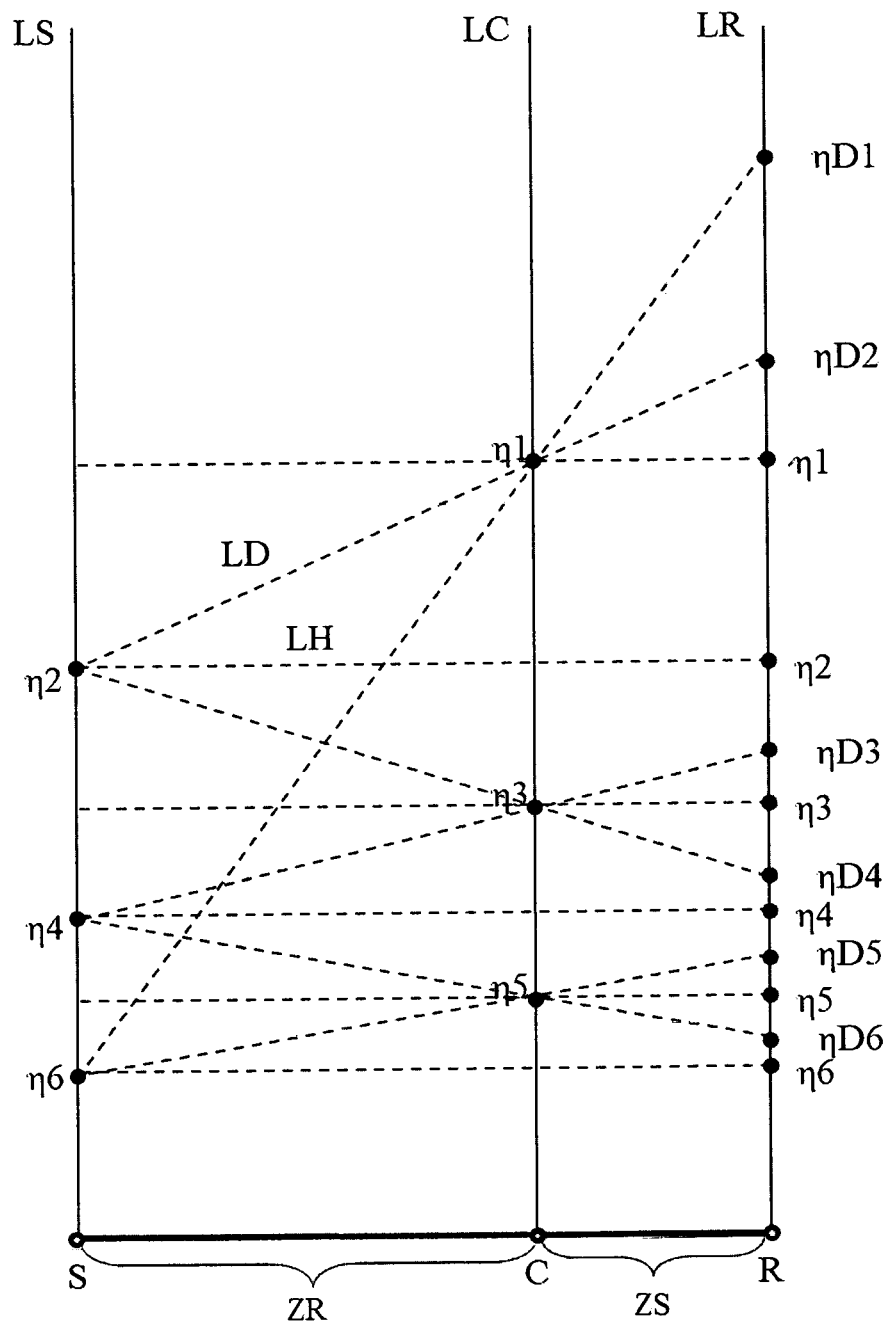
FIG. 5 is the lever diagram presentation of a plurality of original gear ratios and a plurality of derivative speed ratios of the hybrid electric drive train of the invention, with a planetary gear set with single planet gears.

This can be visualized as shown in FIG. 5. Vertical lines LS, LC and LR represent second input shaft 12, first input shaft 11 and engine shaft 2, respectively. According to the connection, Lines LS, LC and LR also represent sun gear S, carrier C and ring gear R, respectively. Points $\eta 1$, $\eta 3$, and $\eta 5$ represent the odd gears, on first input shaft 11, and points $\eta 2$, $\eta 4$, and $\eta 6$ represent the even gears on second input shaft 12, respectively. The ordinates of the points represent the speed ratios of the gears.

Take gear 3 as an example for the odd-numbered gears. If gearset G3 is selected, first input shaft 11 and carrier C will have the speed ratio of $\eta 3$. When clutch 4 is engaged, sun gear S and ring gear R will also have the speed ratio of $\eta 3$. It can be shown by drawing a horizontal line LH through point $\eta 3$ on line LC. Line LH intersects with line LR at point $\eta 3$ on line LR, and, connected to ring gear R, engine shaft 2 will have the speed ratio of $\eta 3$.

Take gear G4 as an example for the even-numbered gears. If gear G4 is selected, second input shaft 12 and sun gear S will have the speed ratio of $\eta 4$. When clutch 4 is engaged, carrier C and ring gear R will also have the speed ratio of $\eta 4$. It can be shown by drawing a horizontal line LH through point $\eta 4$ on line LS. Line LH intersects with line LR at point $\eta 4$ line LR, and, connected to ring gear R, engine shaft 2 will have the speed ratio of $\eta 4$.

As explained as above, engine shaft 2 can achieve each of the gear ratios of $\eta 1$~$\eta 6$ and $\eta R$ by selecting each of gearsets G1~G6 and GR in turn and engaging clutch 4. These speed ratios are called original gear ratios or original speed ratios.

Derivative Speed Ratios

Engine shaft 2 can also achieve a plurality of derivative speed ratios. A derivative speed ratio is achieved when one odd-numbered gearset and one even-numbered gearset are selected at same time. In order for engine shaft 2 to achieve a derivative gear, clutch 4 must be disengaged, otherwise transmission 20 will be locked up. The derivative speed ratios are fixed ratios and may be called as derivative gear ratios.

As mentioned above, the speed ratios of sun gear S, ring gear R and carrier C to output shaft must satisfy the kinematic constraint:

$$ZR \cdot \eta_R + ZS \cdot \eta_S = (ZR + ZS) \cdot \eta_C \qquad (2)$$

When clutch 4 is disengaged, the three elements of PGS 5 can rotate at different speeds. If one of the odd-numbered gearsets is selected, first input shaft 11 and carrier C will have the speed ratio of the odd-numbered gearset selected. If one of the even-numbered gearsets is selected, second input shaft 12 and sun gear S will have the speed ratio of the even-numbered gearset selected. If one odd-numbered gearset and one even-numbered gearset are selected at same time, sun gear S and carrier C will have fixed but different gear ratios. According to EQ. 2, ring gear R will have a fixed speed ratio different from that of sun gear S and carrier C. Connected to ring gear R, engine shaft 2 will have the same fixed gear ratio as ring gear R. So, engine shaft 2 will have a fixed speed ratio different from that of the odd gear and the even gear. For example, if gear G3 and gear G4 are selected, engine shaft 2 will have the speed ratio of $\eta D=[(ZR+ZS) \cdot \eta 3 - ZS \cdot \eta 4]/ZR$. This is a derivative speed ratio, and, sometimes, it is called a derivative gear.

This can be visualized as shown in FIG. 5. Since clutch 4 is disengaged, the three elements of PGS 5 will have different speed ratios. If gearset G3 and gearset G4 are selected as an example, carrier C has a speed ratio of $\eta 3$ and sun gear S has a speed ratio $\eta 4$. Draw a straight line LD through point $\eta 3$ on line LC and point $\eta 4$ on line LS. Line LD intersects with line LR at $\eta D3$ on line LR. According to the kinetic constraint as shown in FIG. 4, the ordinate of point $\eta D3$ represents the speed ratio of engine shaft 2. In other words, engine shaft 2 has a speed ratio of $\eta D3$. This is a derivative gear ratio, and it may be said that engine shaft 2 achieves a derivative gear.

There are many combinations of one odd-numbered gearset and one even-numbered gearset, and a plurality of the combinations make reasonable gear ratios $\eta D1 \sim \eta D6$ for engine shaft 2 as shown in FIG. 5.

System Operation

The hybrid electric drive train may drive the vehicle in at least two modes: electric vehicle mode and hybrid electric vehicle mode.

Electric Vehicle (EV) Mode:

In EV mode, engine 1 is off; brake 3 is engaged to keep engine shaft 2 from rotating; clutch 4 is disengaged to allow a differential drive; one of the odd-numbered gearsets is selected, and motor 6 is ready to drive.

When the driver steps on the accelerator pedal, motor 6 will apply a forward torque on sun gear S. Sun gear S will apply forces on the planet gears, and the planet gears will apply backward torque on ring gear R. Brake 3 will keep ring gear R from rotating backwards and apply a forward reaction torque on ring gear R. As a result, the carrier C will apply a forward torque on first input shaft 11 to drive the wheels. The torque applied on the first input shaft is 1+R/S times of the torque of motor 6. That is, the torque of motor 6 is amplified by a factor of 1+R/S, which may be 2.5 or larger.

When the driver steps on the braking pedal, motor 6 will apply a backward (or braking) torque on sun gear S. Sun gear S will apply forces on the planet gears, and the planet gears will apply forward torque on ring gear R. Brake 3 will keep ring gear R from rotating forwards and apply a backward reaction torque on ring gear R. As a result, the carrier C will apply a backward torque on first input shaft 11 to brake the wheels. At the same time, motor 6 is generating electricity that is stored in a battery (not shown). Again, the braking torque by motor 6 is amplified by a factor of 1+R/S.

In EV mode, it can be shifted from one gear to another by executing the following steps: (1) Reduce the torque of motor 6 to easy the disengagement of the synchronizer. (2) Disengage the synchronizer of the current selected gearset. (3) Adjust the speed of motor 6 to synchronize first input shaft 11 with the odd gearset to-be-selected. (4) Select the new odd gear by engaging its synchronizer. (5) Resume driving by motor 6.

In EV mode, motor 6 is able to drive the wheels through second input shaft by selecting an even gear. In this case, motor 6 can not enjoy the torque amplification by planetary gear set 5. Therefore, motor 6 must apply a larger torque, and motor 6 will be more expensive.

Hybrid Electric Vehicle Mode (HEV Mode):

In HEV mode, brake 3 is disengaged, and engine 1 is running.

When the vehicle stands still, gearset G1 is selected, clutch 4 is disengaged, and first input shaft 11 and carrier C have a zero speed. Since ring gear R is running forwards and carrier C has a zero speed, sun gear S will run backwards. So, motor 6 will run idle backwards, at a negative speed.

When the driver steps on the accelerator pedal, engine shaft 2 applies a torque on ring gear R, and motor rotor 7 applied a forward torque on sun gear S. The two torques are combined and transmitted to carrier C to drive the wheels. While the vehicle is accelerating, the speed of motor 6 will increase in the forward direction. When the speed of motor 7 is about the same as the speed of engine shaft 2, clutch 4 is engaged, and engine shaft 2 achieves original gear 1 with the gear ratio of $\eta 1$. Now planetary gear set 5 is locked-up, and engine 1 and motor 6 can drive in parallel. Engine 1 can either drive, run idle or apply engine-braking torque. Motor 6 can either drive, run idle, generate electricity, or apply regenerative-braking torque.

Gear Change

To shift gear, it is needed to adjust the torques of engine shaft 2 and motor rotor 7. The torque of engine shaft 2 is applied on ring gear R, and the torque of motor rotor 7 is applied on sun gear S. The torque TQE of engine shaft 2 and the torque TQM of motor rotor 7 are balanced when TQE*ZS=TQM*ZR.

In the case that an odd-numbered gearset is selected and clutch 4 is engaged, if torque TQE and torque TQM are balanced, the torque on clutch 4 will be removed. If clutch 4 is disengaged, planetary gear set 5 will stay in dynamic balance.

In the case that an odd-numbered gearset and an even-numbered gearset are selected at same time, if torque TQE and torque TQM are balanced, the torque on the even-numbered gearset will be removed, and it is easy to disengaged the synchronizer of the even-numbered gearset.

It can be shifted from gear 1 to gear 2 by executing the following steps: (1) Adjust the torques of engine 1 and motor 6, so that the two torques are balanced and the torque on first input shaft 11 maintains the same. (2) Disengaged clutch 4, so that motor 6 can adjust the speed of second input shaft 12. (3) Adjust the speed of motor 6 to synchronize second input shaft 12 with gearset G2. (4) Engage synchronizer S2 of gearset G2. (5) Reduce the torque of engine shaft 2 to remove the torque on synchronizer S1 and increase the torque of motor rotor 7 to compensate the output torque. (6) Disengage synchronizer S1. (7) (optional) Adjust the speed of engine shaft 2 to the speed of motor rotor 7, so that the engagement of clutch 4 has little impact on first input shaft 11. (8) Engage clutch 4 and lock up planetary gear set 5. (9) Adjust the torques of engine shaft 2 and motor rotor 7 as needed. Now it is shifted to gear 2.

The shifting procedure from gear 1 to gear 2, as mentioned above, can be generalized. It can be shifted from any odd-numbered gear to an adjacent even-numbered gear by executing the following steps: (1) Adjust the torques of engine 1 and motor 6, so that the two torques are balanced and the torque on first input shaft 11 maintains the same; (2) Disengaged clutch 4. (3) Adjust the speed of motor 6 to synchronize second input shaft 12 with the even gearset to-be-selected. (4) Engage the synchronizer of the even gearset to-be-selected. (5) Reduce the torque of engine shaft 2 to remove the torque on the currently engaged synchronizer, and increase the torque of motor rotor 7 to compensate the output torque. (6) Disengage the synchronizer of the odd gearset currently selected. (7) (optional) Adjust the speed of engine shaft 2 to the speed of motor rotor 7. (8) Engage clutch 4 and lock up planetary gear set 5. (9) Adjust the torques of engine 1 and motor 6 as needed. It can be shifted from any odd-numbered gear to an adjacent even-numbered gear, either up or down.

It can be shifted from gear 2 to gear 3 by executing the following steps: (1) Reduce the torque of engine 1 to zero and increase the torque motor 6 to compensate the output torque. (2) Disengage clutch 4 so that the speed of engine shaft 2 can be adjusted. (3) Adjust the speed of engine shaft 2 to synchronize first input shaft 11 with gearset G3. (4) Engage synchronizer S3 of gearset G3. (5) Increase the torque of engine 1 and reduce the torque of motor 6 so that the two torques are balanced and, as a result, the torque applied on synchronizer S2 is removed. (6) Disengage synchronizer S2 of gearset G2. (7) (optional) Adjust the speed of motor rotor 7 to the speed of carrier C so that the engagement of clutch 4 has little impact on carrier C. (8) Engage clutch 4 and lock up planetary gear set 5. (9) Adjust the torques of engine 1 and motor 6 as needed. Now the system is shifted to the gear 3.

The shifting procedure from gear 2 to gear 3, as mentioned above, can be generalized. It can be shifted from an even-numbered gear to an adjacent odd-numbered gear by executing the following steps: (1) Reduce the torque of engine 1 to zero and increase the torque motor 6 to compensate the output torque. (2) Disengage clutch 4 so that the speed of engine shaft 2 can be adjusted. (3) Adjust the speed of engine shaft 2 to synchronize first input shaft 11 with the odd-numbered gearset to-be-selected. (4) Engage the synchronizer of the odd-numbered gearset to-be-selected. (5) Increase the torque of engine 1 and reduce the torque of motor 6, so that the two torques are balanced to remove the torque applied on the synchronizer of the even-numbered gearset currently selected. (6) Disengage the synchronizer of the even-numbered gear currently selected. (7) (Optional) Adjust the speed of motor rotor 7 to the speed of carrier C. (8) Engage clutch 4 and lock up planetary gear set 5. (9) Adjust the torques of engine 1 and motor 6 as needed. In this way, it can be shifted from any even-numbered gear to an adjacent odd-numbered gear, either up or down.

It can be shifted from an odd-numbered gear to an adjacent derivative gear by executing the following steps: (1) Adjust the torques of engine 1 and motor 6, so that the two torques are balanced and the torque on first input shaft 11 maintains the same. (2) Disengaged clutch 4, so that motor 6 can adjust the speed of second input shaft 12. (3) Adjust the speed of motor rotor 7 to synchronize second input shaft 12 with the even-numbered gearset to-be-selected. (4) Engage the synchronizer of the even gearset to-be-selected. (5) Adjust the torques of engine 1 and motor 6 as needed.

It can be shifted from an derivative gear to an adjacent odd-numbered gear by executing the following steps: (1) Adjust the torques of engine 1 and motor 6, so that the two torques are balanced in order to remove the torque on the even gear currently selected while the output torque maintains the same. (2) Disengaged the synchronizer of the even-numbered gearset currently selected. (3) (Optional) Adjust the speed of motor rotor 7 to the speed of first input shaft 11. (4) Engage clutch 4 to lock the three elements of PGS 5 together. (5) Adjust the torques of engine 1 and motor 6 as needed.

As described above, it can be shifted from any one of the odd-numbered gears to an adjacent even gear, as well as it can be shifted from any one of the even gears to an adjacent odd gear. In addition, it can be shifted from an odd-numbered gear to an adjacent derivative gear, as well as it can be shifted from a derivative gear to an adjacent odd-numbered gear. As a result, engine shaft 2 can achieve each of the original gears and a plurality of derivative gears. During the shifting, whenever one of engine 1 and motor 6 is doing a synchronization, the other one is driving the wheels through a certain gearset selected. There is no power pithole on the wheels during a shifting, and so the shifting can be very smooth.

For the skilled in the art, it is understood that switching the connections of sun gear S with the connections of ring gear R can make a similar system, working in the same ways and having the same functions.

Second Embodiments

Figure 6:
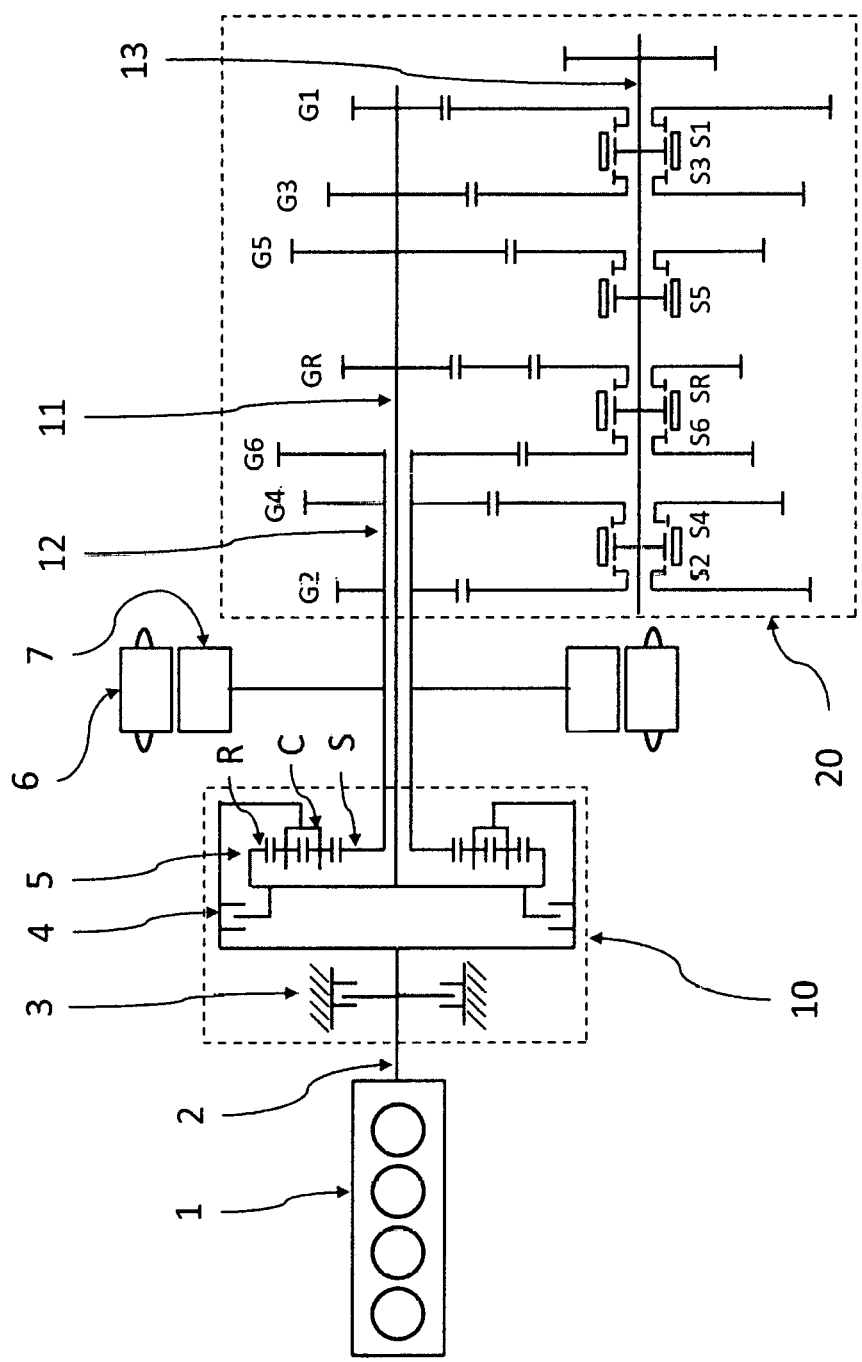
FIG. 6 is the schematic presentation of a second embodiment of a hybrid electric drive train of the invention.

FIG. 6 shows the schematic view of a hybrid electric drive train of a motor vehicle according to a second embodiment of the present invention. The hybrid electric drive train comprises an engine 1 with a drive shaft 2, an electric motor 6 with a rotor 7 operable of motoring and generating, a differential transmission 10, and a multi-stage transmission 20 with two input shafts.

Differential transmission 10 comprises a planetary gear set 5 with dual planet gears, a brake 3, and a clutch 4. Planetary gear set 5 (PGS 5) has at least three elements: a sun gear S, a ring gear R, and a carrier C. Sun gear S is connected to rotor 7 of motor 6, and carrier C is connected engine shaft 2. Brake 3 is connected to carrier C. If it is engaged, brake 3 will keep ring gear R and engine shaft 2 from rotating. Clutch 4 is installed between any two elements of planetary gear set 5. If it is engaged, clutch 4 will lock up planetary gear set 5, and the three elements of PGS 5 will run at a same speed.

Transmission 20 comprises of a first input shaft 11, a second input shaft 12, at least one output shaft 13, a plurality of forward gearsets G1, G2, G3 and etc. and at least a reverse gearset GR. First input shaft 11 is connected to ring gear R, and second input shaft 12 is connected to sun gear S. Each of gearsets G1~G6 and GR has its own synchronizer S1~S6 and SR, and a gearset is said selected if its synchronizer is engaged. The driving gears of the odd-numbered gearsets are mounted on first input shaft 11, and the driving gears of the even-numbered gearsets are mounted on second input shaft 12. The driven gears are mounted on output shaft 13. All the skilled in the art understood that some transmissions have two output shafts in order to reduce the length of transmission 20, and it would not make any different from the view point of speed ratios. Here transmission 20 with 6 pairs of forward gears is just for an example, and more gearsets can be added if it is desired.

Speeds of Sun Gear, Ring Gear and Carrier

Figure 7:
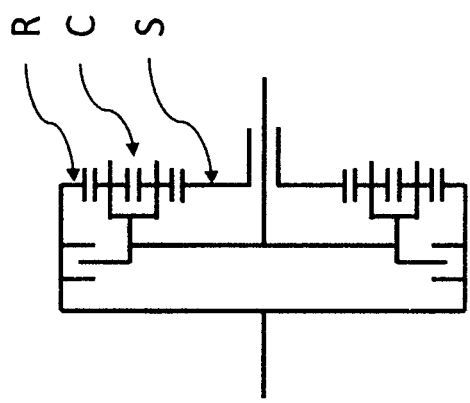
FIG. 7 is the schematic presentation of a planetary gear set with dual planet gears.
Figure 7:
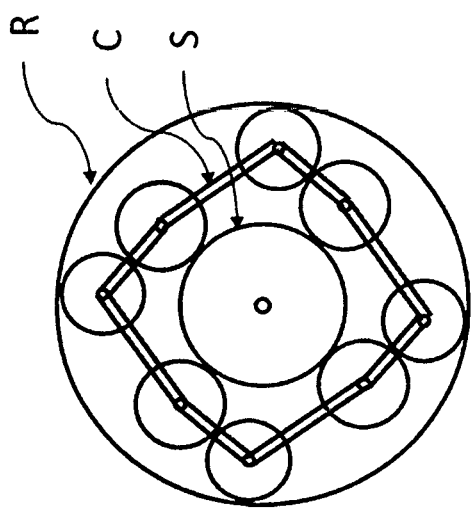

For a planetary gear set (PGS) with dual planet gears as shown in FIG. 7, the speeds of sun gear S, ring gear R, and carrier C must satisfy the kinematic constraint as shown in EQ. (3):

$$ZR \cdot n_R - ZS \cdot n_S = (ZR - ZS) \cdot n_C \quad (3)$$

where $n_S$, $n_R$ and $n_C$ are the speeds of sun gear S, ring gear R and carrier C, respectively, and ZS and ZR are the tooth numbers of sun gear S and ring gear R, respectively.

Figure 8:
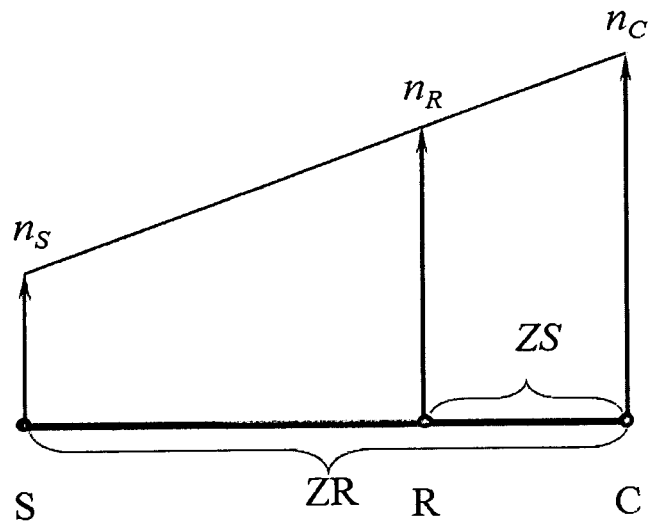
FIG. 8 is the lever diagram presentation of the kinetic constraint among the speeds of the sun gear, the ring gear and the carrier of a planetary gear set with dual planet gears.

This kinematic constraint can be visualized by the lever diagram as shown in FIG. 8. The three nodes on the lever diagram represent sun gear S, ring gear R and carrier C of the planetary gear set, and the lever lengths represent the tooth numbers of sun gear S and ring gear R. Starting from each node and perpendicular to the levers, three vectors represent the direction and magnitude of the speeds of the corresponding elements. The kinematic constraint as shown in Eq. (3) is equivalent to that the ending points of the three vectors are all on a straight (dash) line.

If any two of the three elements are locked together, the two elements will have the same speed. According to the kinematic constraint, the third element also has the same speed, $n_R=n_S=n_C$. In the lever diagram, the three vectors have the same direction and magnitude, and the straight dash line is horizontal.

If both sides of equation (3) are divided by the speed of output shaft 13 of transmission 20, then equation (1) becomes:

$$ZR \cdot \eta_R - ZS \cdot \eta_S = (ZR-ZS) \cdot \eta_C \qquad (4)$$

where $\eta_S$, $\eta_R$, and $\eta_C$ represent the speed ratios of sun gear S, ring gear R and carrier C to output shaft 13 of transmission 20, respectively.

Figure 9:
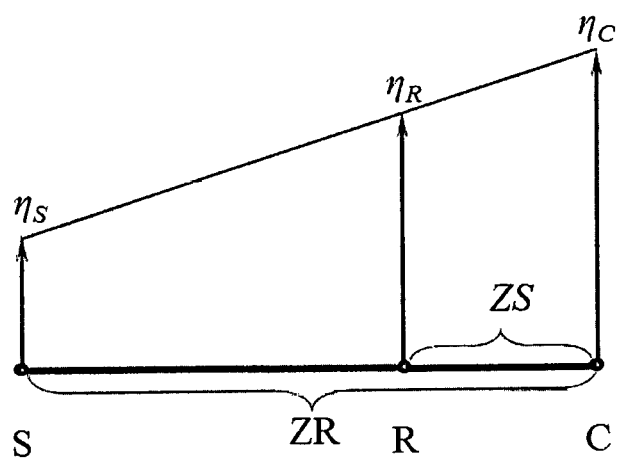
FIG. 9 is the lever diagram presentation of the kinetic constraint among the speed ratios of the sun gear, the ring gear and the carrier of a planetary gear set with dual planet gears.

Now in the lever diagram as shown in FIG. 9, the three vectors represent the speed ratios of sun gear S, ring gear R and carrier C to output shaft 13, respectively.

If clutch 4 between any two of the three elements is engaged, the two elements will have the same speed. As a result, the third element will have the same speed. That is, if clutch 4 is engaged, sun gear S, ring gear R and carrier C will rotate at the same speed.

$$n_R=n_S=n_C$$

and $$\eta_R=\eta_S=\eta_C$$

which can be visualized by a horizontal straight line in the lever diagram.

Original Speed Ratios

In transmission 20, each of the gearsets G1~G6 has a fixed gear ratio. Gearset 1 has a fixed gear ratio of $\eta 1$, gearset 2 has a fixed gear ratio of $\eta 2$ and etc. If the synchronizer of a certain gearset is engaged, the gearset is said selected. For example, gearset G3 is selected if synchronizer S3 engaged. If an odd-numbered gearset is selected, first input shaft 11 will have the speed ratio of the odd-numbered gearset selected. If an even-numbered gearset is selected, second input shaft 12 will have the speed ratio of the even-numbered gearset selected.

If clutch 4 is engaged, the three elements of PGS 5 are locked together and run at the same speed. According to the connection, engine shaft 2, first input shaft 11 and second input shaft 12 will have the same speed ratio as well as. Under this condition, if an odd-numbered gearset is selected, engine shaft 2 will have the speed ratio of the selected odd-numbered gearset; if an even-numbered gearset is selected, engine shaft 2 will have the speed ratio of the selected even-numbered gearset. Therefore, by selecting each of the gearsets in turn, engine shaft 2 can achieve each of speed ratios of $\eta 1$, $\eta 2$, $\eta 3$, $\eta 4$, $\eta 5$, $\eta 6$ etc.

Figure 10:
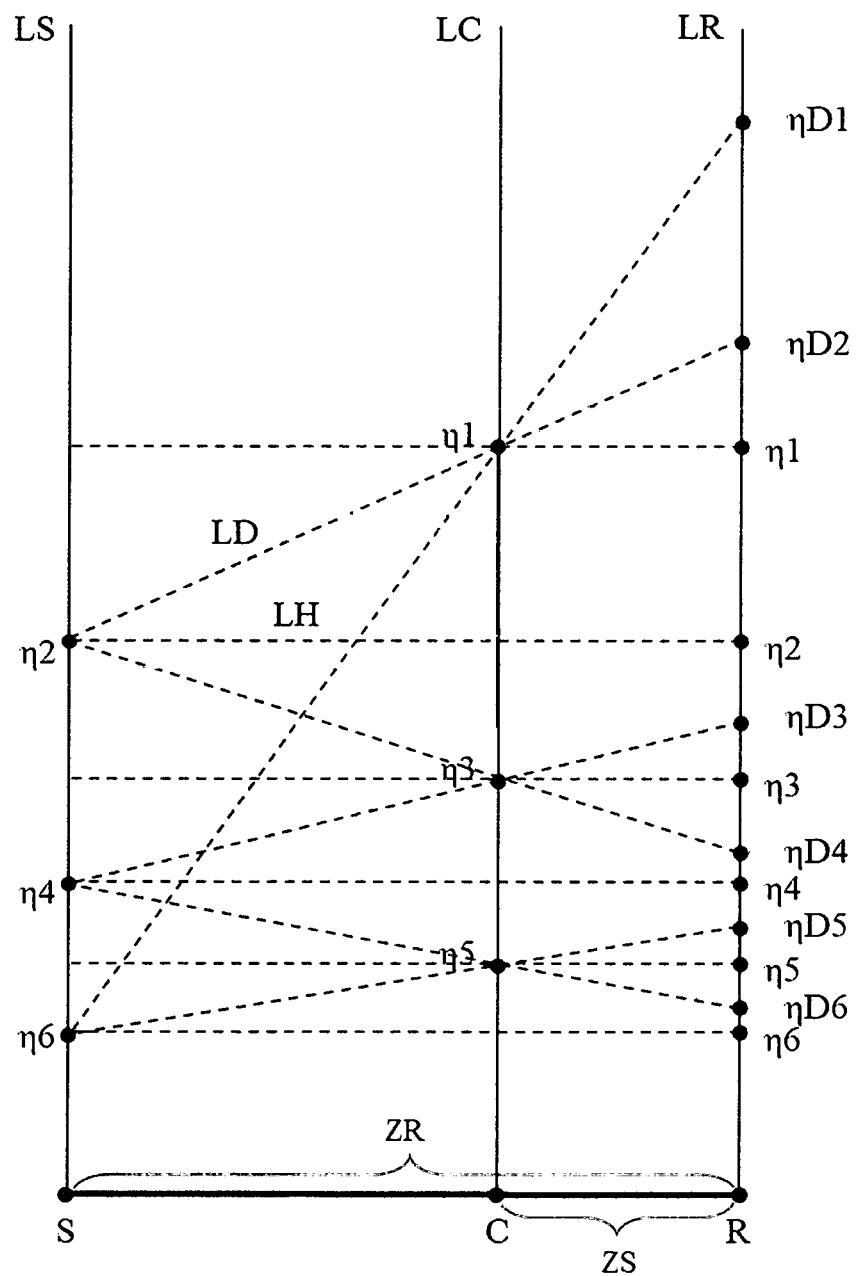
FIG. 10 is the lever diagram presentation of a plurality of original gear ratios and a plurality of derivative speed ratios of the hybrid electric drive train of the invention; with a planetary gear set with dual planet gears.

This can be visualized as shown in FIG. 10. Vertical lines LS, LR and LC represent second input shaft 12, first input shaft 11 and engine shaft 2, respectively. According to the connection, Lines LS, LR and LC also represent sun gear S, ring gear R and carrier C, respectively. Points $\eta 1$, $\eta 3$, and $\eta 5$ represent the odd-numbered gears on first input shaft 11, and points $\eta 2$, $\eta 4$, and $\eta 6$ represent the even-numbered gears on second input shaft 12, respectively. The ordinates of the points represent the speed ratios of the gears.

Take gear 3 as an example for the odd gears. If gearset G3 is selected, first input shaft 11 and carrier C will have the speed ratio of $\eta 3$. When clutch 4 is engaged, sun gear S and ring gear R will also have the speed ratio of $\eta 3$. It can be shown by drawing a horizontal line LH through point $\eta 3$ on line LR. Line LH intersects with line LC at point $\eta 3$ on line LC, and, being connected to carrier C, engine shaft 2 will have the speed ratio of $\eta 3$.

Take gear G4 as an example for the even-numbered gears. If gear G4 is selected, second input shaft 12 and sun gear S will have the speed ratio of $\eta 4$. When clutch 4 is engaged, carrier C and ring gear R will also have the speed ratio of $\eta 4$. It can be shown by drawing a horizontal line LH through point $\eta 4$. Line LH intersects with line LC at point $\eta 4$, and, being connected to ring gear R, engine shaft 2 will have the speed ratio of $\eta 4$.

As explained as above, engine shaft 2 can achieve each of the gear ratios of $\eta 1 \sim \eta 6$ and $\eta R$ by selecting each of gearsets G1~G6 and GR in turn and engaging clutch 4. These speed ratios are called original gear ratios or original speed ratios.

Derivative Speed Ratios

Engine shaft 2 can also achieve a plurality of derivative speed ratios. Engine shaft 2 achieves a derivative speed ratio when one odd-numbered gearset and one even-numbered gearset are selected at same time. In order to achieve a derivative gear, clutch 4 must be disengaged, otherwise transmission 20 will be locked up.

As mentioned above, the speed ratios of sun gear S, ring gear R and carrier C to output shaft must satisfy the kinematic constraint:

$$ZR \cdot \eta_R - ZS \cdot \eta_S = (ZR-ZS) \cdot \eta_C \qquad (4)$$

When clutch 4 is disengaged, the three elements of PGS 5 can rotate at different speeds. If one of the odd-numbered gearsets is selected, first input shaft 11 and ring gear R will have the speed ratio of the odd-numbered gearset selected. If one of the even-numbered gearsets is selected, second input shaft 12 and sun gear S will have the speed ratio of the selected even gearset. If one odd-numbered gearset and one even-numbered gearset are selected at same time, sun gear S and ring gear R will have fixed but different gear ratios. According to EQ. (4), carrier C will have a fixed speed ratio different from that of sun gear S and ring gear R. Being connected to carrier, engine shaft 2 will have the same fixed gear ratio as carrier C. So, engine shaft 2 will have a fixed speed ratio different from that of the odd-numbered gearset and the even-numbered gearset. For example, if gear G3 and gear G4 are selected, engine shaft 2 will have the speed ratio of $\eta D3=[(ZR-ZS) \cdot \eta 3+ZS\eta 4]/ZR$. This is a derivative speed ratio, and, sometimes, it is called a derivative gear.

This can be visualized as shown in FIG. 10. Since clutch 4 is disengaged, the three elements of PGS 5 will have different speed ratios. If gearset G3 and gearset G4 are selected as an example, carrier C has a speed ratio of $\eta 3$ and sun gear S has a speed ratio $\eta 4$. Draw a straight line LD through point $\eta 3$ on line LC and point $\eta 4$ on line LS. Line LD intersects with line LR at $\eta D3$. According to the kinetic constraint as shown in FIG. 4, the ordinate of point $\eta D3$ represents the speed ratio of engine shaft 2. In other words, engine shaft 2 has a speed ratio of $\eta D3$.

There are many combinations of one odd gear and one even gear, and a plurality of the combinations make reasonable gear ratios $\eta D1 \sim \eta D6$ for engine shaft 2 as shown in FIG. 10.

System Operation

The hybrid electric drive train may drive the vehicle in at least 2 modes: electric vehicle mode and hybrid electric vehicle mode.

Electric Vehicle (EV) Mode:

In EV mode, engine 1 is off; brake 3 is engaged to keep engine shaft 2 from rotating; clutch 4 is disengaged to allow a differential drive; one odd-numbered gearset is selected, and the motor 6 is ready to drive.

When the driver steps on the accelerator pedal, motor 6 will apply a forward torque on sun gear S, and Sun gear S tends to run forwards. Brake 3 is applied to keep carrier C from rotating backwards. The dual planet gears change the direction of the torque twice, and so sun gear S will drive ring gear R forwards. As a result, ring gear R will apply a forward torque on first input shaft 11 to drive the wheels. The torque applied on first input shaft 11 is R/S times of the motor torque. That is, the motor torque is amplified by a factor of R/S. Motor 6 can also apply backward (braking) torque on sun gear R to slow down the vehicle, and, at the same time, it generates electricity.

In EV mode, the gear ratio of motor rotor 7 can be change. The gear can be shifted by executing the following steps: (1) Reduce the torque of motor 6 to easy the disengagement of the synchronizer. (2) Disengage the synchronizer of the gearset currently selected. (3) Adjust the speed of motor 6 to synchronize first input shaft 11 with the odd-numbered gearset to-be-selected. (4) Select the new odd-numbered gear by engaging its synchronizer. (5) Resume driving by motor 6.

In EV mode, motor 6 is also capable to drive the wheels through second input shaft by selecting an even-numbered gearset. In this case, motor 6 can not enjoy the torque amplification by planetary gear set 5. Therefore, motor 6 must apply a larger torque, and motor 6 will be more expensive.

Hybrid Electric Vehicle Mode (HEV Mode):

In HEV mode, brake 3 is disengaged, and engine 1 is running.

When the vehicle stands still, first gearset G1 is selected, clutch 4 is disengaged, and first input shaft 11 and ring gear R have a zero speed. Since carrier C is running forwards and ring gear R has a zero speed, sun gear S will run backwards, and so motor 6 will run idle backwards, at a negative speed.

When the driver steps on the accelerator pedal, engine shaft 2 applies a torque on carrier C, and motor rotor 7 applied a forward torque on sun gear S. The two torques are combined and transmitted to ring gear R to drive the wheels through gearset G1. While the vehicle is accelerating, the speed of motor 6 will increase in the forward direction. When the speed of motor 7 is about the same as the speed of engine shaft 2, clutch 4 is engaged, and engine shaft 2 has a fixed gear ratio of η1. Now planetary gear set 5 is locked-up, and engine 1 and motor 6 can drive in parallel. Engine 1 can either drive, run idle or apply engine-braking torque. Motor 6 can either drive, run idle, generate electricity, or apply regenerative-braking torque.

In HEV mode, engine shaft 2 can achieve a plurality of original speed ratios and a plurality of derivative speed ratios. It can be shifted from an odd-numbered gear to an adjacent even-numbered gear, and vice versa. Also, it can be shifted from an odd-numbered gear to an adjacent derivative gear, and vice versa.

Change Gear

To shift gear, it is needed to adjust the torques of engine shaft 2 and rotor 7. The torque of engine shaft 2 is applied on carrier, and the torque of rotor 7 is applied on sun gear S. The torque TQE of engine shaft 2 and the torque TQM of motor rotor 7 are balanced when $TQE*ZS=TQM*(ZR-ZS)$.

It can be shifted from an odd-numbered gear to an adjacent even-numbered gear by executing the following steps: (1) Adjust the torques of engine 1 and motor 6, so that the two torques are balanced and the torque on first input shaft 11 maintains the same. (2) Disengaged clutch 4, so that motor 6 can adjust the speed of second input shaft 12. (3) Adjust the speed of motor rotor 7 to synchronize second input shaft 12 with the even-numbered gearset to-be-selected. (4) Engage the synchronizer of the even-numbered gearset to-be-selected. (5) Reduce the torque of engine shaft 2 to remove the torque on the odd-numbered gearset currently selected, and increase the torque of motor rotor 7 to compensate the output torque. (6) Disengage the synchronizer of the odd-numbered gearset currently selected. (7) (optional) Adjust the speed of engine shaft 2 to the speed of motor rotor 7. (8) Engage clutch 4 to get planetary gear set 5 locked. (9) Adjust the torques of engine 1 and motor 6 as needed.

It can be shifted from an even-numbered gear to an adjacent odd-numbered gear by executing the following steps: (1) Reduce the torque of engine 1 to zero and increase the torque motor 6 to compensate the output torque. (2) Disengage clutch 4, so that the speed of engine shaft 2 can be adjusted. (3) Adjust the speed of engine shaft 2 to synchronize first input shaft 11 with the odd-numbered gearset to-be-selected. (4) Engage the synchronizer of the odd-numbered gearset to-be-selected. (5) Increase the torque of engine 1 and reduce the torque of motor 6, so that the two torques are balanced to remove the torque applied on the even-numbered gear currently selected. (6) Disengage the synchronizer of the even-numbered gear currently selected. (7) (Optional) Adjust the speed of motor rotor 7 to the speed of carrier C. (8) Engage clutch 4 to lock up planetary gear set 5. (9) Adjust the torques of engine 1 and motor 6 as needed. In this way, the system can be shifted from any even gear to one of its adjacent odd gears, either up or down.

It can be shifted from an odd-numbered gear to an adjacent derivative gear by executing the following steps: (1) Adjust the torques of engine 1 and motor 6, so that the two torques are balanced and the torque on first input shaft 11 maintains the same. (2) Disengaged clutch 4, so that motor 6 can adjust the speed of second input shaft 12. (3) Adjust the speed of motor rotor 7 to synchronize second input shaft 12 with the even gearset to-be-selected. (4) Engage the synchronizer of the even gearset to-be-selected. (5) Adjust the torques of engine 1 and motor 6 as needed.

It can be shifted from an derivative gear to an adjacent odd-numbered gear by executing the following steps: (1) Adjust the torques of engine 1 and motor 6, so that the two torques are balanced in order to remove the torque on the even-numbered gearset currently selected while the output torque maintains the same. (2) Disengaged the synchronizer of the even-numbered gearset currently selected. (3) (Optional) Adjust the speed of motor rotor 7 to the speed of first input shaft 11. (4) Engage clutch 4 to lock the three elements of PGS 5 together. (5) Adjust the torques of engine 1 and motor 6 as needed.

As described above, it can be shifted from any one of the odd-numbered gears to an adjacent even-numbered gear, as well as it can be shifted from any one of the even-numbered gears to an adjacent odd-numbered gear. In addition, it can be shifted from an odd-numbered gear to an adjacent derivative gear, as well as it can be shifted from a derivative gear to an adjacent odd-numbered gear. As a result, engine shaft 2 can achieve each of the original gears and a plurality of derivative gears. During the shifting, whenever one of engine 1 and motor 6 is doing a synchronization, the other one is driving the wheels through a certain gearset selected.

There is no power pithole on the wheels during a shifting, and so the shifting can be very smooth.

For the skilled in the art, it is understood that switching the connections of sun gear S with the connections of carrier C can also make a similar system, working in the same ways and having the same functions.

It should be understood that there is no intention to limit the invention to the specific forms disclosed, but on the contrary, the invention is to cover all variations, modifications and improvements that come with the true spirit and scope of the invention as expressed in the appended claims.

What is claimed is:

1. A hybrid electric drive train of a motor vehicle comprising:
   a heat engine with a drive shaft;
   an electric motor having a rotor and being operable to motor and generate;
   a planetary gear set having at least a first element, a second element and a third element, wherein said first element is connected to said motor rotor, and said second element is connected to said engine shaft;
   a clutch being installed between any two of the three elements of said planetary gear set;
   a brake being connected to said second element of said planetary gear set;
   a multi-stage transmission with a first input shaft, second input shaft and at least one output shaft, wherein said first input shaft is connected to said third element of said planetary gear set, and said second input shaft is connected to said first element of said planetary gear set;
   said multi-stage transmission having a plurality of gear sets, including at least one reverse gear sets, wherein the driving gears of the odd-numbered gear sets are mounted on said first input shaft, the driving gears of the even-numbered gear sets are mounted on said second input shaft, and the driven gears of all said gear sets are mounted on said output shaft;
   wherein while said clutch is engaged, if one of said gear sets is selected, said engine shaft has the gear ratio of the selected gear sets, and said engine shaft can achieve every gear ratio of said gear sets is selected in turn;
   wherein while said clutch is disengaged, said engine shaft achieves a derivative speed ratio if the odd-numbered gear sets and even-numbered gear sets are selected at the same time, and since a plurality of different combinations of one odd-numbered gear sets and one even-numbered gear sets can be selected in turn, said engine shaft can achieve a plurality of derivative speed ratios.

2. The hybrid electric drive train according to claim 1, wherein said planetary gear set is with single planet gears.

3. The hybrid electric drive train according to claim 2, wherein said first element is a sun gear, said second element is a ring gear, and said third element is a carrier.

4. The hybrid electric drive train according to claim 2, wherein said first element is a ring gear, said second element is a sun gear, and said third element is a carrier.

5. The hybrid electric drive train according to claim 1, wherein said planetary gear set is with dual planet nears.

6. The hybrid electric drive train according to claim 5, wherein said first element is a sun gear, said second element is a carrier, and said third element is a ring gear.

7. The hybrid electric drive train according to claim 5, wherein said first element is carrier, said second element is a sun gear, and said third element is a ring gear.

* * * * *